(12) United States Patent
Singh et al.

(10) Patent No.: US 12,725,241 B2
(45) Date of Patent: Sep. 1, 2026

(54) OPTICAL INSPECTION-BASED AUTOMATIC DEFECT CLASSIFICATION

(71) Applicant: Applied Materials, Inc., Santa Clara, CA (US)

(72) Inventors: Navneet Kumar Singh, Fremont, CA (US); Arun Ramaswamy Srivatsa, Fremont, CA (US); Sachin Dangayach, San Jose, CA (US); Zvi Hersh Goldshtein, Sunnyvale, CA (US); Rahul Reddy Komatireddi, Hyderabad (IN); Sutapa Dutta, Kolkata (IN); Arv Nagpal, Bengaluru (IN); Yen-Tien Wu, Castro Valley, CA (US)

(73) Assignee: Applied Materials, Inc., Santa Clara, CA (US)

( * ) Notice: Subject to any disclaimer, the term of this patent is extended or adjusted under 35 U.S.C. 154(b) by 270 days.

(21) Appl. No.: 18/482,209

(22) Filed: Oct. 6, 2023

(65) Prior Publication Data

US 2025/0117915 A1 Apr. 10, 2025

(51) Int. Cl.
*G06T 7/00* (2017.01)

(52) U.S. Cl.
CPC .. *G06T 7/0004* (2013.01); *G06T 2207/20081* (2013.01); *G06T 2207/30148* (2013.01)

(58) Field of Classification Search
CPC ......... G06T 7/0004; G06T 2207/20081; G06T 2207/30148; G06T 2207/20084
See application file for complete search history.

(56) References Cited

U.S. PATENT DOCUMENTS 9,726,615 B2 8/2017 Huang et al.
10,365,617 B2 * 7/2019 Lin .................... G05B 13/0265
(Continued)

FOREIGN PATENT DOCUMENTS

CN 113333329 A 9/2021

OTHER PUBLICATIONS

Hu, et al., "Surface Defect Classification in Silicon Wafer Manufacturing Using Linear-Based Channeling and Rule-Based Binning," Journal of Material Sciences & Engineering, vol. 10:8, 2021, 4 page. https://www.hilarispublisher.com/open-access/surface-defect-classification-in-silicon-wafer-manufacturing-using-linearbased-channeling-and-rulebased-binning.pdf.
(Continued)

*Primary Examiner* — Bobbak Safaipour
(74) *Attorney, Agent, or Firm* — Lowenstein Sandler LLP

(57) ABSTRACT

Implementations disclosed describe, among other things, a systems and techniques for perform efficient inspection of a semiconductor manufacturing sample. The techniques include collecting optical inspection data for training sample(s) that have a plurality of defects. The techniques further include generating, using the optical inspection data, a training data set that includes descriptions, images, and ground truth classifications for the defects. The techniques further include using the training data set to train a plurality of machine learning (ML) classifiers to generate predicted classifications for the defects in the training sample(s). The techniques further include selecting, using the predicted classifications and the ground truth classifications, one or more ML classifiers that meet one or more accuracy criteria, and using the selected ML classifier(s) to classify defects in the semiconductor manufacturing sample.

21 Claims, 5 Drawing Sheets

(56) References Cited

U.S. PATENT DOCUMENTS

| | | | | |
|---|---|---|---|---|
| 11,468,553 | B2 * | 10/2022 | Kulkarni | G06T 5/73 |
| 11,493,901 | B2 * | 11/2022 | Ouyang | G06N 20/00 |
| 2012/0027285 | A1 * | 2/2012 | Shlain | G06F 18/2431 382/149 |
| 2013/0279796 | A1 * | 10/2013 | Kaizerman | G06V 10/774 382/149 |
| 2015/0125064 | A1 * | 5/2015 | Chen | G06F 18/24323 382/149 |
| 2016/0328837 | A1 * | 11/2016 | He | G06T 7/0004 |
| 2019/0213725 | A1 | 7/2019 | Liang et al. | |
| 2019/0384236 | A1 | 12/2019 | Lin et al. | |
| 2020/0218241 | A1 * | 7/2020 | Soltanmohammadi | G05B 19/41875 |
| 2021/0174200 | A1 | 6/2021 | Huang et al. | |
| 2022/0138921 | A1 * | 5/2022 | Lu | G06T 5/40 382/149 |
| 2022/0222806 | A1 | 7/2022 | Shaubi et al. | |
| 2022/0343140 | A1 * | 10/2022 | Qu | G06N 3/045 |
| 2023/0288345 | A1 * | 9/2023 | Bar | G01N 21/9501 |

OTHER PUBLICATIONS

International Search Report and Written Opinion for International Application No. PCT/US2024/050122, mailed Jan. 22, 2025, 12 Pages.

* cited by examiner

OPTICAL INSPECTION-BASED AUTOMATIC DEFECT CLASSIFICATION

TECHNICAL FIELD

This instant specification generally relates to defect classification More specifically, the instant specification relates to optical inspection-based automatic defect classification.

BACKGROUND

Manufacturing of modern materials often involves various deposition techniques, e.g., chemical vapor deposition and physical vapor deposition, etching techniques, polishing techniques, photo-masking techniques, and/or various other manufacturing techniques. Materials manufactured in this manner may include monocrystals, semiconductor films, fine coatings, and numerous other substances used in practical applications, such as electronic device manufacturing. Many of such applications rely on the purity of the materials and samples prepared in manufacturing systems. Various detection and sensing systems are used to monitor adherence of processing operations to manufacturing specification, maintain optimal chemical composition and physical conditions of processing environments, and so on. Quality of intermediate and final products is monitored with inspection systems, including optical inspections. Optical inspections can include reflectometry techniques, spectrometry techniques, ellipsometry techniques, etc. Optical inspections can be performed using specularly reflected light, diffusely reflected (scattered) light, transmitted light, or various combinations thereof.

SUMMARY

Figure 1:
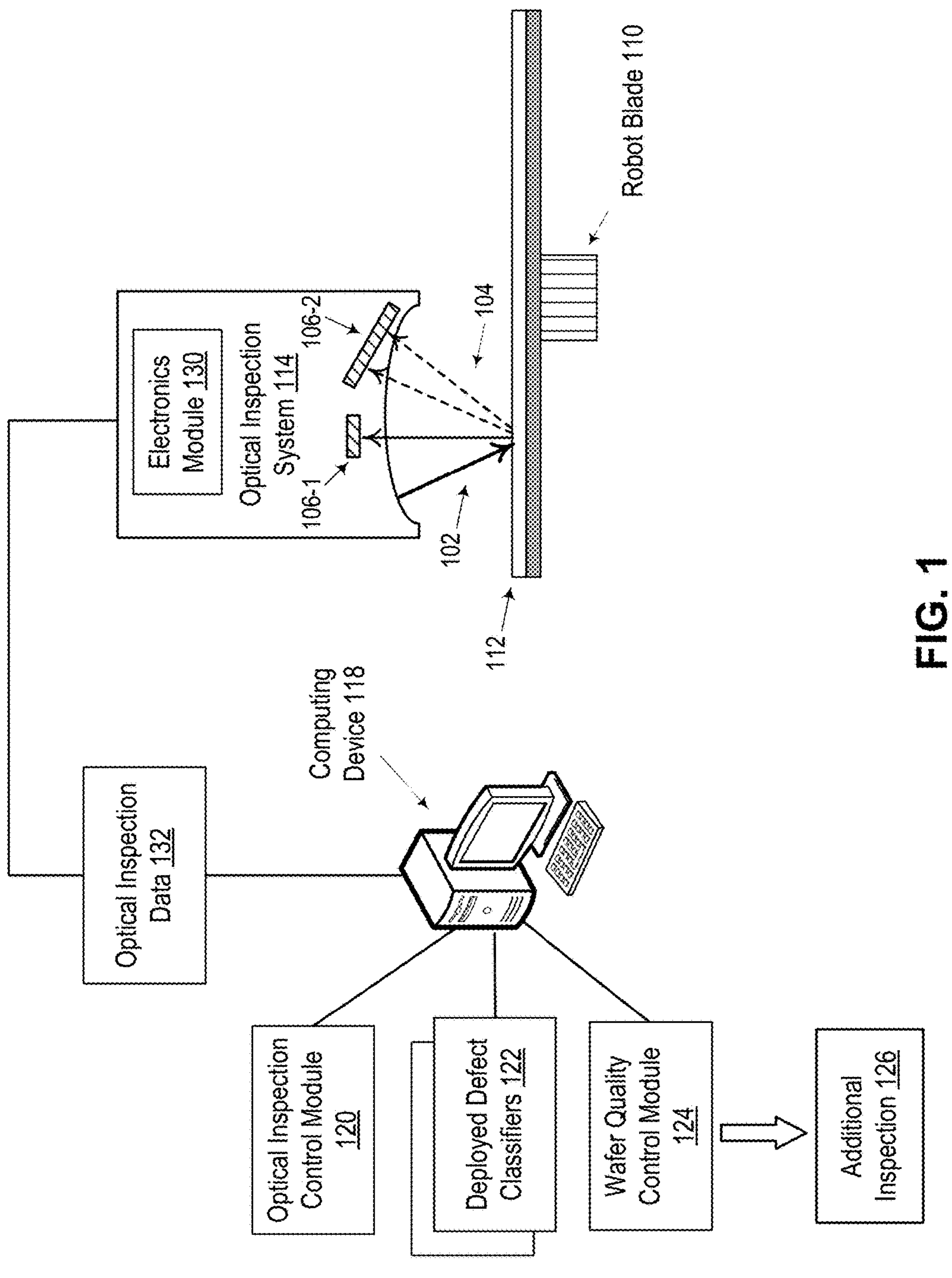
FIG. 1 illustrates an example sample quality control system capable of supporting efficient optical inspection of manufacturing samples for defect detection and classification using multiple machine learning models, in accordance with at least one embodiment.

Some of the embodiments described herein are related to a method that includes collecting optical inspection data for one or more training samples, the one or more training samples having a plurality of defects, and generating, using the optical inspection data, a training data set that includes one or more characteristics associated with the plurality of defects. The method further includes using the training data set to train a plurality of machine learning (ML) classifiers to generate predicted classifications for the plurality of defects in the one or more training samples. The method further includes selecting, using the predicted classifications and the one or more characteristics associated with the plurality of defects, one or more ML classifiers from the plurality of ML classifiers, wherein the one or more selected ML classifiers meet one or more accuracy criteria. The method further includes using the one or more selected ML classifiers to classify one or more defects in the semiconductor manufacturing sample.

Another embodiment described herein is related to a computing system that includes a memory device and a processing device communicatively coupled to the memory device. The processing device is to receive optical inspection data for one or more training samples, the one or more training samples comprising a plurality of defects, and generate, using the optical inspection data, a training data set that includes one or more characteristics associated with the plurality of defects. The processing device is further to use the training data set to train a plurality of machine learning (ML) classifiers to generate predicted classifications for the plurality of defects in the one or more training samples. The processing device is further to select, using the predicted classifications one or more characteristics associated with the plurality of defects, one or more ML classifiers from the plurality of ML classifiers, wherein the one or more selected ML classifiers meet one or more accuracy criteria. The processing device is to use the one or more selected ML classifiers to classify one or more defects in a semiconductor manufacturing sample.

Another embodiment described is related to a non-transitory computer-readable medium storing instructions that, when executed by a processing device, cause the processing device to perform operations that include receiving optical inspection data for one or more training samples, the one or more training samples including a plurality of defects, and generating, using the optical inspection data, a training data set that includes one or more characteristics associated with the plurality of defects. The operations further include using the training data set to train a plurality of machine learning (ML) classifiers to generate predicted classifications for the plurality of defects in the one or more training samples. The operations further include selecting, using the predicted classifications and the one or more characteristics associated with the plurality of defects, one or more ML classifiers from the plurality of ML classifiers, wherein the one or more selected ML classifiers meet one or more accuracy criteria. The operations further include using the one or more selected ML classifiers to classify one or more defects in the semiconductor manufacturing sample

DETAILED DESCRIPTION

Semiconductor device manufacturing often involves tens and even hundreds of complex operations to implement raw wafer (substrate) preparation, polishing, material deposition, patterning, etching, and the like. Since even a small number of impurities or other defects introduced into processing environments during such operations can render the manufacturing products (masks, wafers, chips, etc.) unusable for their intended purposes, various manufacturing operations are often interspersed with quality control inspections to verify adherence of intermediate and final products to specifications of the technological processes being carried out. Inspections can determine the degree of cleanliness of products (also referred to as samples herein), presence of defects in the samples, dimensions of the samples, physical and chemical compositions of the samples, surface morphology of the samples, and/or the like.

For example, a bare wafer, or a wafer with a film deposited thereon, can undergo a quality control inspection prior to further processing (such as deposition, etching, and/or the like). The quality control inspections can use scanning electron microscopy (SEM) imaging, which can sometimes be deployed in conjunction with X-ray spectroscopy (e.g., energy dispersive X-ray spectroscopy). SEM imaging has high (Angstrom-size) resolution but is a slow process. Because scanning a whole (e.g., 30 cm in diameter) wafer takes a substantial time, optical inspection techniques are often used prior to SEM imaging. Optical (including ultraviolet) inspection techniques are capable of scanning an entire wafer in 2-3 minutes. Optical inspection systems are capable of detecting impurities, crystal lattice defects, pits, stains, and/or other sample imperfections, and/or the like. However, optical inspection systems deploy light with the wavelengths in the range of hundreds of nanometers. This makes distinguishing types of defects (e.g., crystal vacancies from substitution defects) difficult unless defects are large along at least one dimension (e.g., linear scratches or stained spots). Therefore, optical inspection is often used to identify locations (coordinates) of defects while exact defect types are subsequently determined using targeted SEM imaging of the corresponding locations. Nonetheless, with a typical wafer requiring 100-200 locations to be SEM-examined, and often further inspected by an engineer who performs final classification of defects among types, inspection of a large number of wafers produced by an industrial-scale wafer manufacturing machine can still take a long time, e.g., 48-72 hours from the time the wafer is ready for inspection until the time the wafer's defects are classified.

Aspects and embodiments of the present disclosure address these and other challenges of the existing technology by providing for techniques and systems that efficiently use optical inspection data to classify most defects while reserving for high-resolution (e.g., SEM) imaging only a small portion (e.g., around/about 10%) of all defects. The high efficiency of optical inspection is achieved by training, using SEM-data (or other applicable ground truth data), a substantial number of machine learning (ML) models (e.g., 5, 6, or more) to process optical inspection data and perform classification of defects based on the optical inspection data. A set of one or more of the trained ML models may then be deployed for inference of optical inspection of wafers for which no ground truth data is collected. The sets of deployed ML models can be tailored to specific tasks (e.g., associated with sample types and/or types of sample processing). Each set of ML models can be selected from a plurality of ML models, e.g., all trained ML models, based on the respective model's accuracy in detection of defects for a particular task. For example, a first set of ML models can be determined to be most accurate (and, correspondingly, deployed) with detecting defects in bare silicon wafers, a second set of ML models can be deployed for inspection of wafers with deposited $SiO_2$ films, a third set of ML models can be deployed for inspection of wafers subjected to chemical-mechanical polishing (CMP), and so on.

Selection and deployment of ML models can be based on various evaluation metrics characterizing the ML models' accuracy, e.g., precision, recall, F1 score, and/or the like. The ML models can include Decision Trees (Forests), Adaptive Boosting models, Gradient Boosting models, K-Nearest Neighbor classifiers, Logistic Regression models, Support Vector Machines, Linear Discriminant Approximations, Deep Neural Networks, and/or other models. After task-based sets of trained ML models are deployed, such sets of models can be used for inference detection of most defects without using high-resolution (e.g., SEM) imaging systems. In some instances, e.g., where predicted defects are of particular importance and/or defects are of a type that is determined with confidence that is below a threshold confidence, the defects can be directed to high-resolution imaging. In some embodiments, a certain fixed portion (e.g., 10 percent or any other empirically-determined percent) of defects of each sample (wafer) can be directed to high-resolution imaging. Additionally, some randomly-selected defects (from each sample or from a sample selected by some deterministic of the deployed sets of ML models.

The disclosed embodiments pertain to optical inspections performed in the context of a variety of manufacturing techniques, such as bare wafer manufacturing, chemical mechanical polishing (CMP), physical vapor deposition (PVD), chemical vapor deposition (CVD), plasma-enhanced PVD and/or CVD, atomic layer CVD, combustion CVD, catalytic CVD, evaporation deposition, molecular-beam epitaxy techniques, wafer patterning, photo-mask application, etching, CMP, and/or any other suitable techniques. The disclosed embodiments can also be advantageously used to improve manufacturing techniques that use vacuum deposition chambers (e.g., ultrahigh vacuum CVD or PVD, low-pressure CVD, etc.) and/or atmospheric pressure deposition chambers.

FIG. 1 illustrates an example sample quality control system 100 capable of supporting efficient optical inspection of manufacturing samples for defect detection and classification using multiple machine learning models, in accordance with at least one embodiment. In some embodiments, sample quality control system 100 can be used to perform an inline inspection where a product is being transferred between processing chambers, between a processing chamber and a transfer chamber, between a transfer chamber and a load lock chamber, between a load-lock chamber and a product carrier, and/or the like. In some embodiments, sample quality control system 100 can be used as a free-standing inspection system. In some embodiments, an optical inspection is performed by optical inspection system 114 on a sample 112 (e.g., wafer, a mask, a film, a patterned product, or any combination thereof) carried by a movable stage, e.g., a robot blade 110, that supports and moves sample 112. Optical inspection system 114 can be used to facilitate detection of defects in sample 112 as described in more detail in conjunction with FIGS. 2-4 below.

Optical inspection system 114 scans sample 112 with one or more beams of light 102 and collects light 104 reflected or scattered from sample 112. Reflected/scattered light 104 may include light specularly reflected from sample 112 (as part of a bright-field optical inspection) and/or light non-specularly (e.g., diffusively) scattered from sample 112 (as part of a dark-field optical inspection). Reflected/scattered light 104 can be detected by one or more light detectors 106-1, 106-2, etc. Different light detectors **106-*k* can be engineered, configured, and positioned to detect light reflected/scattered into a specific range of reflection/scattering angles (e.g., light detectors 106-*k* can be narrow-angle detectors, wide-angle detectors, and/or the like), specific polarizations (e.g., s-polarized light, p-polarized light, left/right circularly polarized light, etc.), and/or the like. In those instances where light 102 includes multiple spectral components (e.g., a plurality of narrow spectral beams or one or more wide spectral beams), different light detectors 106-1 can collect different spectral components of reflected/scattered light 104. Light 102 and, respectively, reflected/scattered light 104 can include visible light, ultraviolet (UV) light, infrared (IR) light, and/or electromagnetic waves belonging to other parts of the electromagnetic spectrum. Light detectors 106**-*k* can use complementary metal-oxide-semiconductor (CMOS) image sensors, charge-coupled devices (CCDs), hybrid CMOS-CCD image sensors, photomultiplier tubes (e.g., an array of photocathode-based pixels), photodiodes, phototransistors, or any other suitable photon detectors. Each light detector 106-*k* can image a portion of sample 112 illuminated by light 102.

An electronics module 130 can control operations of optical inspection system 114 and can further control at least some processing of optical inspection data collected by optical inspection system 114. Electronics module 130 can include a microcontroller and a memory device (e.g., buffer) coupled to the microcontroller. The memory device can be used to store instructions that control operations of optical inspection system 114 and can further store collected optical inspection data 132 before transmitting the optical inspection data to a computing device 118. In some embodiments, electronics module 130 can perform initial processing of optical inspection data 132. For example, as light detectors 106-*k* collect pixel intensities for various image patches of sample 112 (e.g., 50×50 μm patches or patches of some other size), electronics module 130 can perform initial screening of buffered image patches and determine whether a given image patch includes a depiction of one or more defects. Image patches that do not depict any defects (such as image patches capturing only a background signal, e.g., a signal with a low signal-to-noise ratio, SNR) can be discarded (overwritten) whereas patches that depict likely defects (e.g., having reflected/scattered light with the SNR above a certain threshold) can be stored as optical inspection data 132.

Computing device 118 can include an optical inspection control module 120 that selects (e.g., in response to instructions stored on computing device 118 or received from a human operator of sample quality control system 100) modes of inspection, resolution of optical inspection, wavelengths used by optical inspection system 114, inspection frequency (e.g., pulsed light source repetition rate), wavelength(s) of inspection, zoom of objectives, and the like.

Computing device 118 can deploy multiple ML defect classifiers 122 to process optical inspection data 132 collected by optical inspection system 114. As disclosed in more detail below, deployed defect classifiers 122 can be trained to determine dimensions, types, concentrations, and/or locations of various defects and imperfections of sample 112. Wafer quality control module 124 can compare the obtained number, type, dimensions, etc., of the detected defects in sample 112 with specifications of the manufacturing process being performed and determine adherence of sample 112 to those specifications. Wafer quality control module 124 can then determine whether sample 112 is to be removed from the manufacturing line, returned to the manufacturing line for further processing (e.g., additional polishing, deposition, cleaning, etc.), or direct sample 112 for additional inspection 126, which can include SEM inspection, X-ray spectroscopy, tunneling electron microscopy (TEM) inspection, atomic force microscopy (AFM) inspection, neutron scattering inspection, and/or any other applicable high-resolution inspection.

Figure 2:
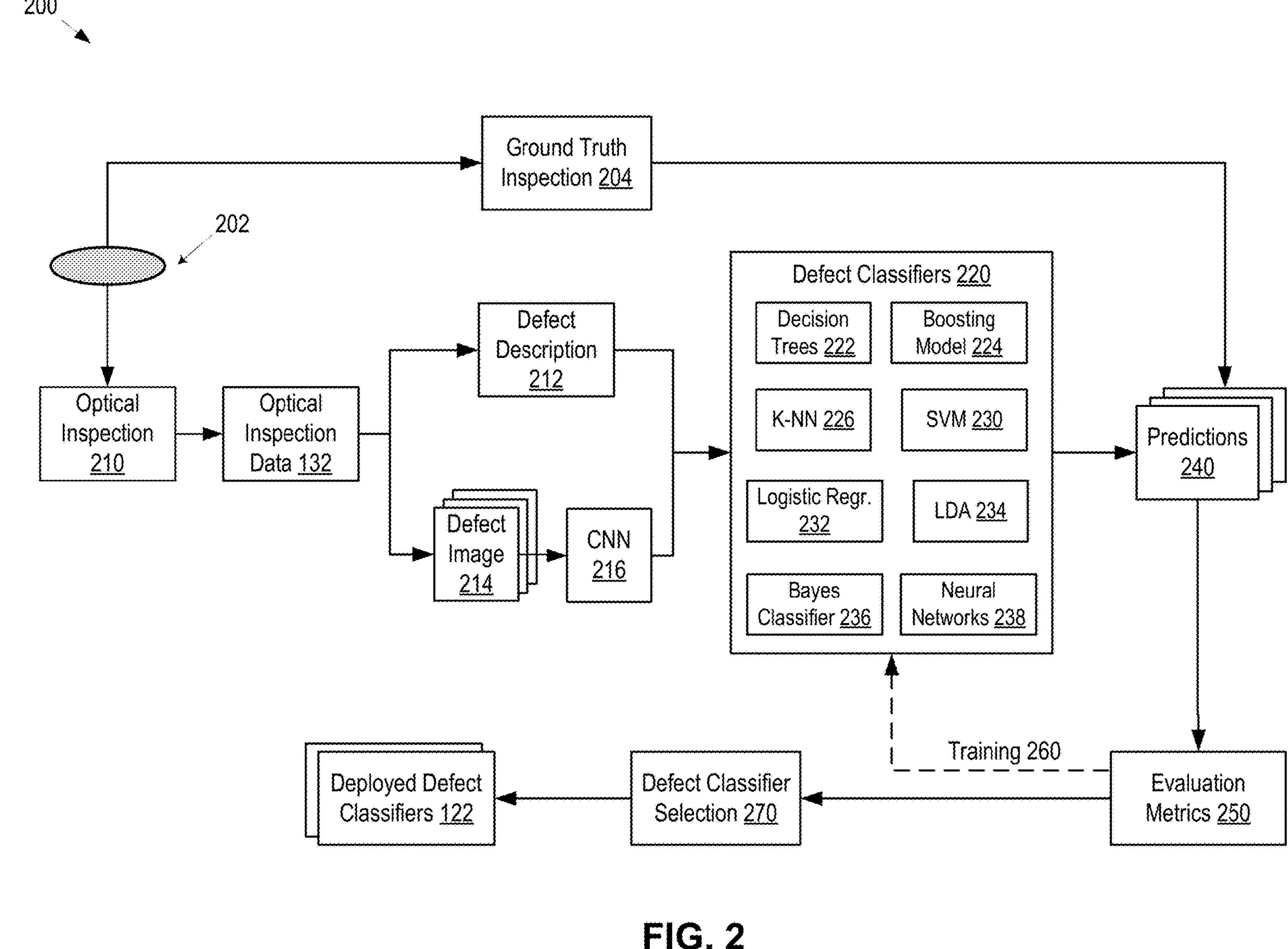
FIG. 2 illustrates an example process flow of training and deployment of optical inspection-based defect classification in wafer manufacturing systems using multiple machine learning models, in accordance with at least one embodiment.

FIG. 2 illustrates an example process flow 200 of training and deployment of optical inspection-based defect classification in wafer manufacturing systems using multiple machine learning models, in accordance with at least one embodiment. Process flow 200 can include subjecting a sample 202 to an optical inspection 210, e.g., using an optical inspection system 114 illustrated in FIG. 1, to collect optical inspection data 132. Sample 202 can include a silicon wafer, a glass wafer, a quartz wafer, a corundum wafer, and/or any other type of wafer, which can be transparent, non-transparent, opaque, and/or the like. The wafer of sample 202 can undergo any type of processing, including polishing, beveling, chemical cleaning, drying, residue removal, and/or the like. Any suitable conducting, insulating, and/or semiconducting film (or multiple films) can be deposited on one or both surfaces of sample 202. The film(s) can be patterned or unpatterned. Sample 202 can undergo any additional processing, including but not limited to etching, PVD, CVD, CMP, and/or the like. During training, sample 202 can additionally undergo a ground truth inspection 204, which can include any suitable high-resolution inspection, including but not limited to SEM, EDX, TEM, AFM, and/or the like, or any combination thereof. Ground truth inspection 204 can provide high-resolution data indicative of types, dimensions, and/or other characteristics of defects present in sample 202. Defects may include, as a way of illustration but not limitation, surface defects, embedded defects, crystal structure imperfections, inclusions of extraneous materials, pits, bumps, cracks, scratches, and/or any other imperfections.

Optical (including ultraviolet) inspection techniques are capable of scanning an entire wafer in 2-3 minutes. Optical inspection data 132 can include defect description 212 and defect images 214. In some embodiments, defect description can be a text file (or some other digital file) with descriptions of defects detected by optical inspection 210 in sample 202. For example, defect description 212 can include a table (or any other suitable data structure, e.g., a CSV file, a JSON file, etc.) that is indexed with sample coordinates (e.g., Cartesian XY coordinates, polar Rϕ coordinates, and/or the like) of defects. Each defect description 212 entry (a table cell or a similar data unit) can include any suitable information collected by the optical inspection system about one or more defects located at the corresponding set of sample coordinates. Such information can include (but need not be limited to): a size of the defect(s), an SNR for the defect(s), a number of photons collected from the defect area (or a similar representation of reflected/scattered light intensity) by individual light detectors 106-*k* and/or ratio of photons collected by different light detectors 106-*k* (e.g., narrow-view/wide-view detectors), an angle/frequency distribution of reflected/scattered light imperfections, and/or other information collected by the optical inspection system.

Defect description 212 can be used as an input into multiple defect classifiers 220 that are being trained to output predictions 240 about defects in sample 202. In some embodiments, an additional input into defect classifiers 220 can include defect images 214, which can be image patches of individual defects (or closely positioned clusters of defects) of sample 202. Defect images 214 can be indexed using the same indexing scheme (e.g., XY coordinates) as used in defect description 212, so that defect classifiers 220 can process matching pairs of textual and graphical image information related to the same area(s) of sample 202. In some embodiments, individual defect images 214 can be processed by a convolutional neural network (CNN) 216 that outputs feature vectors representative of the content of defect images 214. In some embodiments, CNN 216 may be a convolutional backbone of an auxiliary neural network that also includes one more classification heads outputting—during training—one or more classifications (e.g., predictions 240) of defects in defect mages 214 based on feature vectors generated by the backbone. The outputted classifications can be used, as training outputs, to train the auxiliary neural network (both the convolutional backbone and the classification head(s)), e.g., using classifications obtained with ground truth inspection 204, as target outputs. After training of the auxiliary neural network, its convolutional backbone can be stored and deployed as CNN 216 to generate ML-readable feature vectors representative of visual appearance of defects in defect images 214, for use in training of defect classifiers 220 and subsequent use of deployed defect classifiers 220 for inference predictions.

Defect classifiers 220 can include multiple ML models that are being trained to predict defect classifications, including but not limited to Decision Trees (Forests) ML models 222. A Decision Tree represents a graph of learned conditional decisions (decision nodes) that define paths to a plurality of classifications (leaf nodes). For example, one of the decision nodes can select from two branches depending on whether the total photon count of scattered photons is below or above a certain threshold. Another decision node can select further two branches depending on what fraction of the total photon count was detected by a narrow-angle detector, and/or the like. Decision Trees can be combined into Decision Forests, where different Decision Trees have different decision/leaf nodes and generate classifications that differ from each other for at least one path. Predictions by different Decision Trees can be aggregated (e.g., by simple or weighted voting) to generate a final prediction of the Decision Forest.

Defect classifiers 220 can further include Boosting ML models 224, which combine multiple weak learners to generate a smaller number of strong learners. For example, after a first model is built using a training dataset, a second model can be built to reduce errors of predictions of the first model, and so on. This boosting procedure is continued (by training additional models) until the prediction errors are minimized/reduced. The one or more Boosting ML models can include Adaptive Boosting ML models, Gradient Boosting models, Extreme Gradient Boosting models, Light Gradient Boosting models, XGBoost models, CatBoost models, and/or other models deploying one or more types of boosting algorithms.

Defect classifiers 220 can further include K-Nearest Neighbor (K-NN) classifiers 226, which classify new data points by considering a number (K) of closest neighbors (with known or previously predicted classifications) and selecting predictions for the new data points based on K closest neighbors, e.g., based on a class most widely represented among those closest neighbors.

Defect classifiers 220 can further include Support Vector Machine (SVM) models 230, which learn how to optimally place lines and/or other boundaries (surfaces, hypersurfaces, etc.) to segment a multi-dimensional feature space (characterizing data sets) into regions associated with correct classes.

Defect classifiers 220 can further include Logistic Regression models 232, which estimate classification probabilities using a suitable approximation function (e.g., a sigmoid function) of a dot product of input data set feature vector(s) and a vector of learned coefficients.

Defect classifiers 220 can further include Linear Discriminant Analysis (LDA) models 234, which learn the most discriminative axes between the classes; such axes then define hyperplane(s) onto which data can be projected, keeping classes as distinct from each other as possible.

Defect classifiers 220 can further include Bayes classifiers 236, which presume existence of some features that determine classification of sets of data using Bayes' theorem that relates conditional probabilities of classes for given features (posterior probability) to (1) conditional probabilities of features given known classes (likelihood probabilities) and (2) probabilities of occurrences of those classes in training sets of data (prior probabilities). Bayes' classifiers often rely on certain assumptions about the features, such as different features occurring in the sets of data independently of other features, in the instances of Naïve Bayes' classifiers.

Defect classifiers 220 can further include one or more neural networks 238, which include neuron linear and nonlinear computations arranged into multiple layers. Neural networks 238 can have different architectures (e.g., different numbers of neuron layers and different topologies of neural connections, types of activation functions being used, and/or the like) and can have different learnable parameters (e.g., weights and biases) learned during training. Neural networks 238 can include convolutional neural networks, fully-connected neural networks, a combination of the convolutional and fully-connected neural networks, recurrent neural networks, long short-term memory neural networks, neural networks with attention, transformer neural networks, and/or the like.

Various neural networks 238 can be trained using training data that includes appropriate training inputs and corresponding target outputs (correct labels for the respective training inputs). For example, training inputs can include optical inspection data 132 for a set of defects for which ground truth (target outputs) is available. The target outputs can include defect classifications obtained using any suitable techniques of ground truth inspection 204 (e.g., SEM) and performed with human input (e.g., engineer-performed defect classifications), without human input (e.g., classifications obtained using other—teacher—models previously trained to classify defects based on their SEM images or other high-resolution images of defects), or with reduced human input (e.g., classification obtained by teacher models and validated by process engineers). During training, neural networks 238 learn to find patterns in the training data that maps training inputs to respective target outputs. During training, parameters (e.g., weights and biases) of neural networks 238 can be changed until the networks successfully learn how to perform defect classification tasks. Training of neural networks 238 can be controlled by setting appropriate hyperparameters, such as learning rate, batch size, number of training epochs, and/or the like.

It should be understood that the list of defect classifiers 220 is intended to be illustrative and not limiting and that various models not specifically listed above can be trained, evaluated, selected, and deployed as disclosed herein.

During training, various defect classifiers 220 can process training inputs that include defect descriptions 212 (containing textual information about defects) and feature vectors representing visual information of defect images 214 (e.g., as can be outputted by CNN 216 backbone). Inputs into defect classifiers 220 can be digitized via a set of numbers $a_1 \ldots a_N$, each number $a_k$ representing a particular entry (or a part of an entry) in defect description 212. Additionally, the set of numbers $\{a_k\}$ can include feature vectors representing defect images 214. In one example non-limiting embodiment, a feature vector for a given image, e.g., as outputted by CNN 216, can be an M-bit vector (e.g., M=512, 1024, and/or any other number of bits selected as part of architecture of CNN 216). The feature vector can include n-components $b_1 \ldots b_n$, each component having M/n bits. For example, a 512-bit feature vector can be represented as eight 64-bit components $b_1 \ldots b_8$. The set of feature vector components $b_1 \ldots b_n$ can be a subset of the inputs $a_1 \ldots a_N$ that are processed by defect classifiers 220.

Examples of inputs $a_1 \ldots a_N$ include (but are not limited to) a size of a particular defect (e.g., determined as an area of sample 202 generating reflected/scattered light with an SNR above a noise SNR), an average SNR for the defect, a total number of photons collected from the defect area (which can be further partitioned among multiple detectors, multiple wavelengths, and/or multiple polarizations), or some other representation of reflected/scattered light intensity, angle-resolved number of collected photons, and/or other similar information collected by the optical inspection system.

Defect classifiers 220 can treat inputs $a_1 \ldots a_N$ as vector components in an N-dimensional feature space and can compute predictions 240 using these vector components. For example, K-Nearest Neighbor models 226 can operate by identifying clusters of points in the feature space and Support Vector Machine models 230 can operate by segmenting the feature space into regions associated with different classes, and so on. Neural networks 238 can map the feature vectors to classes $a_1 \ldots a_N \rightarrow C_i$ using neuron operations. Logistic regression classifiers 232 can apply a sigmoid function (or some other regression function) $\sigma(x)$ to the dot product $x=\Sigma_j c_j a_j$ of input vector $(a_1 \ldots a_N)$ and a vector of learned coefficients $(c_1 \ldots c_N)$.

In some embodiments, the same inputs $a_1 \ldots a_N$ can be processed by all defect classifiers 220. In some embodiments, some of defect classifiers 220 can be processing inputs that one or more other defect classifiers are not processing.

During training, defect classifiers 220 learn to output predictions 240 (defect classifications). In some embodiments, training can be (at least partially) individualized for different types of samples. For example, a first set of defect classifiers 220 can be trained for wafers that have undergone CVD and can be different from a second/third/etc. set of defect classifiers 220 trained for wafers that have been subjected to PVD/etching/CMP, and/or any other type of processing. Such individualized training can be advantageous since different types of processing can result in different types of defects that can be better captured with different models, e.g., neural networks can be most accurate for classification of defects of induced by one type of processing while decision forests can perform better for another type of processing, and/or the like. Individualized training can include a first (common) stage, where all sets of defect classifiers 240 are pre-trained using the same set of training inputs (e.g., a mix of samples after various types of processing), and a second stage where different sets of defect classifiers 220 undergo additional training using samples associated with respective types of processing operations. In some embodiments, training can be performed without the pre-training common stage.

Predictions 240 can include classifications over a discrete set of classes ("bins"), including but not limited to types of defects (e.g., pits, extraneous material inclusions, scratches, surface defects, embedded defects, and/or the like), dimensions of defects (large, intermediate, small, etc.), and/or the like. In some embodiments, some of predictions 240 can be continuous (floating-point predictions), e.g., dimensions of defects in suitable units of length (e.g., microns, etc.). In some embodiments, predictions 240 can include defect sub-types, such as different material types of extraneous inclusions.

Evaluation metrics 250 can be computed for trained defect classifiers 220 to identify classifiers whose predictions 240 have the highest accuracy. In some embodiments, evaluation metrics 250 can be computed for predictions 240 generated for a validation subset of training inputs, e.g., training inputs not previously seen by the defect classifiers and reserved for their validation. Each of trained defect classifiers 220 can process the validation subset and generate predictions 240 that are compared with the ground truth labels for the validation subset.

Various evaluation metrics 250 can be used to evaluate accuracy of defect classifiers across a set of types/classes $\{C_i\}$ (including various subtypes), such as precision, recall, and/or the like. For example, precision $P_i$ is a ratio of a number of defects correctly classified into class $C_i$ to a total number of defects classified into class $C_i$. Recall $R_i$ is a ratio of the number of defects correctly classified into class $C_i$ to a total number of defects belonging to class $C_i$. Additional evaluation metrics can be defined and computed, such as an F1 score, which is a harmonic mean of precision and recall, $F_i=2P_i \times R_i/(P_i+R_i)$. Further evaluation metrics can include precision, recall, and/or F1 scores that are aggregated (e.g., averaged) over various classes $C_i$.

Evaluation metrics 250 (as described above and/or other similar evaluation metrics) can be deployed for evaluation of predictions 240 generated by defect classifiers 220 both for training 260 and defect classifier selection 270. In particular, during training 260, learnable parameters of defect classifiers 220 can be adjusted to maximize evaluation metrics 250 individually for each defect classifier 220. During defect classifier selection 270, evaluation metrics 250 previously maximized for individual classifiers can be compared across different classifiers and a target number of classifiers can then be selected to be deployed for inference classifications.

In some embodiments, the target number M of deployed defect classifiers 122 can be a predetermined number (e.g., two, three, four, and/or the like). In some embodiments, the target number of deployed defect classifiers 122 can itself be determined as part of evaluation of the trained classifiers. For example, all models with individual F1 scores $F_i$ (or F1 scores aggregated across various classes) above a certain threshold, e.g., 95%, or some other target percentage, can be deployed as defect classifiers for a given type of samples/sample processing. In some embodiments, a combination of these selection techniques can be used, e.g., at most M highest-accuracy defect classifiers can be selected from those classifiers whose accuracy (precision, recall, F1 scores, and/or any combination thereof) is above the target percentage.

Figure 3:
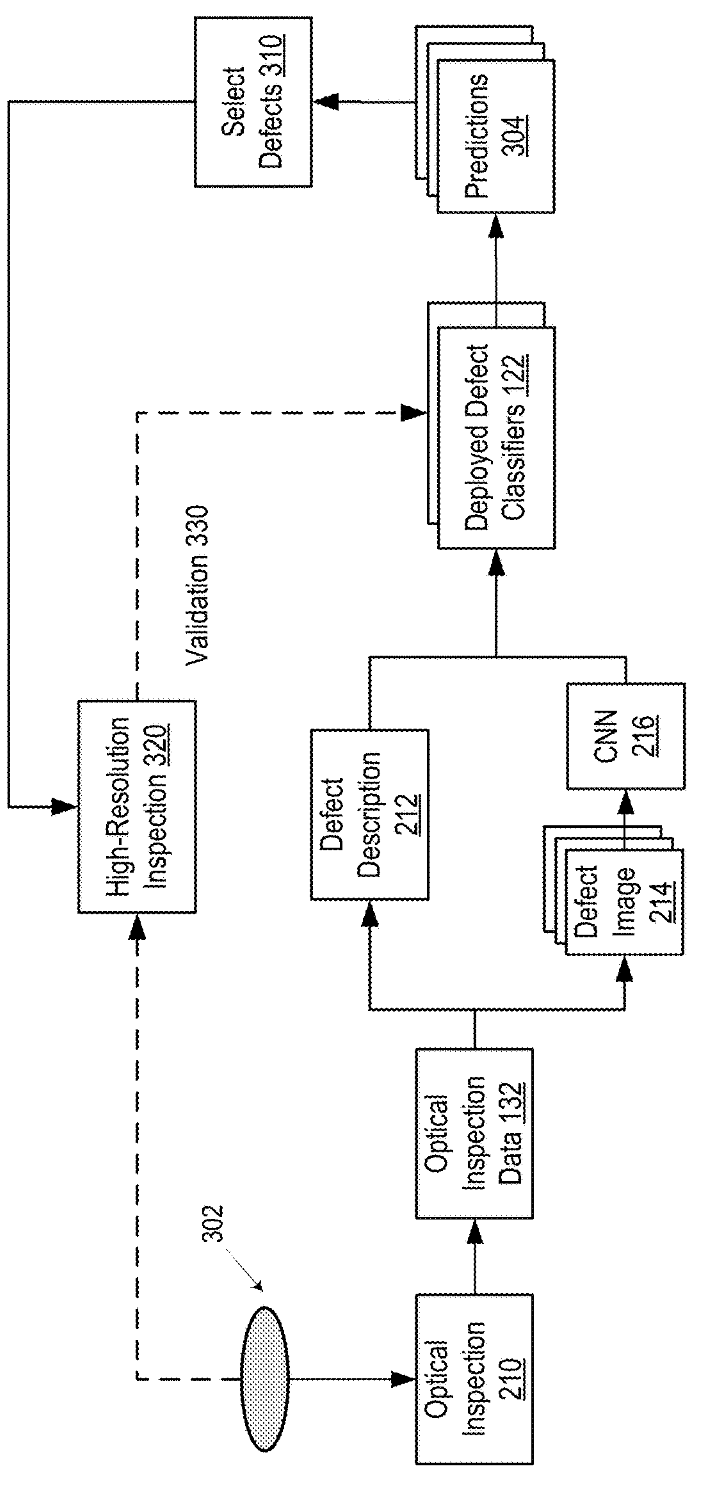
FIG. 3 illustrates an example process flow of an inference stage of optical inspection-based defect classification that uses multiple machine learning models, in accordance with at least one embodiment.

FIG. 3 illustrates an example process flow 300 of an inference stage of optical inspection-based defect classification that uses multiple machine learning models, in accordance with at least one embodiment. Process flow 300 can include subjecting a sample 302, for which high-resolution ground truth inspection data is not (at least initially) available, to optical inspection 210, e.g., using an optical inspection system 114 illustrated in FIG. 1. The collected optical inspection data 132 can be handled similarly to handling of such data in conjunction with process flow 200 of FIG. 2 above. More specifically, optical inspection data 132 can include defect description 212 and a digital representation of visual information contained in defect images 214 (e.g., as encoded by CNN 216 and/or other neural network backbone).

Defect description 212 can be used as an input into a particular set $S_l$ of deployed defect classifiers 122. Multiple sets $S_1, S_2, S_3 \ldots$ of deployed defect classifiers 122 can be available, each set $S_l$ trained to detect and classify defects that are specific to a type of processing to which sample 302 has been subjected, e.g., prior to optical inspection 210. For example, a set $S_1$ of deployed defect classifiers 122 used for bare wafers can include a decision forest model, a logistic regression model, and a neural network model, a set $S_2$ of deployed defect classifiers 122 used for wafers with silica films can include a K-nearest neighbor classifier and a Bayes classifier, and/or the like. Deployed defect classifiers 122 can output predictions 304 that include coordinates of detected defects, types of the detected defects, dimensions of the detected defects, estimates of depths of the detected defects (in the instances of embedded defects), and/or the like. Predictions 304 can be used (e.g., by wafer quality control module 124 in FIG. 1) to select or affirm (e.g., once it is determined that the number and types of defects in sample 302 are within acceptable tolerance) one or more subsequent processing operations to be performed on sample 302 according to an applicable technological specification, including but not limited to etching of sample 302, deposition of one or more additional materials on sample 302, patterning sample 302, and/or subjecting sample 302 to any other processing operations. Predictions 304 can also be used to determine that the quality of sample 302 is outside acceptable tolerances and that, therefore, sample 302 is to be discarded or directed for some remedial processing, e.g., CMP, and/or the like.

In some embodiments, a majority of detected defects can be correctly classified by deployed defect classifiers 122 based on optical inspection data 132, which requires only a short time (e.g., up to or less than several minutes) to collect. This speeds up the manufacturing process considerably. In some instances, a portion of defects can be selected for additional high-resolution inspection 320. For example, the select defects 310 can be (or appear to be) defects that are of a type that is particularly difficult to diagnose (e.g., a type for which deployed defect classifiers 122 have not achieved a target accuracy, as measured by precision, recall, and/or F1 score). In some embodiments, the select defects 310 can include m defects, where m is a certain predetermined number of defects that can be analyzed with high-resolution inspection reasonably quickly, without causing significant delays in the manufacturing process. These m defects can be selected randomly from all defects identified in sample 302, from defects located at some specific regions of sample 302 (e.g., near sample edges), from defects of a particular type (e.g., embedded defects), and/or based on some other selection protocol.

In some embodiments, a random number of defects in sample 302 can be selected for high-resolution inspection 320 as part of periodic validation 330 of deployed defect classifiers 122. In some instances, a random sample 302 can be chosen from a line of samples with all (or at least a substantial portion of) defects of such randomly-chosen sample used for validation 330 of deployed defect classifiers 122. In the instances where accuracy (e.g., as represented by various evaluation metrics referenced above) of deployed defect classifiers 122 during validation 330 is below a target accuracy, the deployed defect classifiers 122 can be retrained using additional training data sets, which can be performed similarly to initial training of the classifiers, as disclosed in conjunction with FIG. 2.

Figure 4:
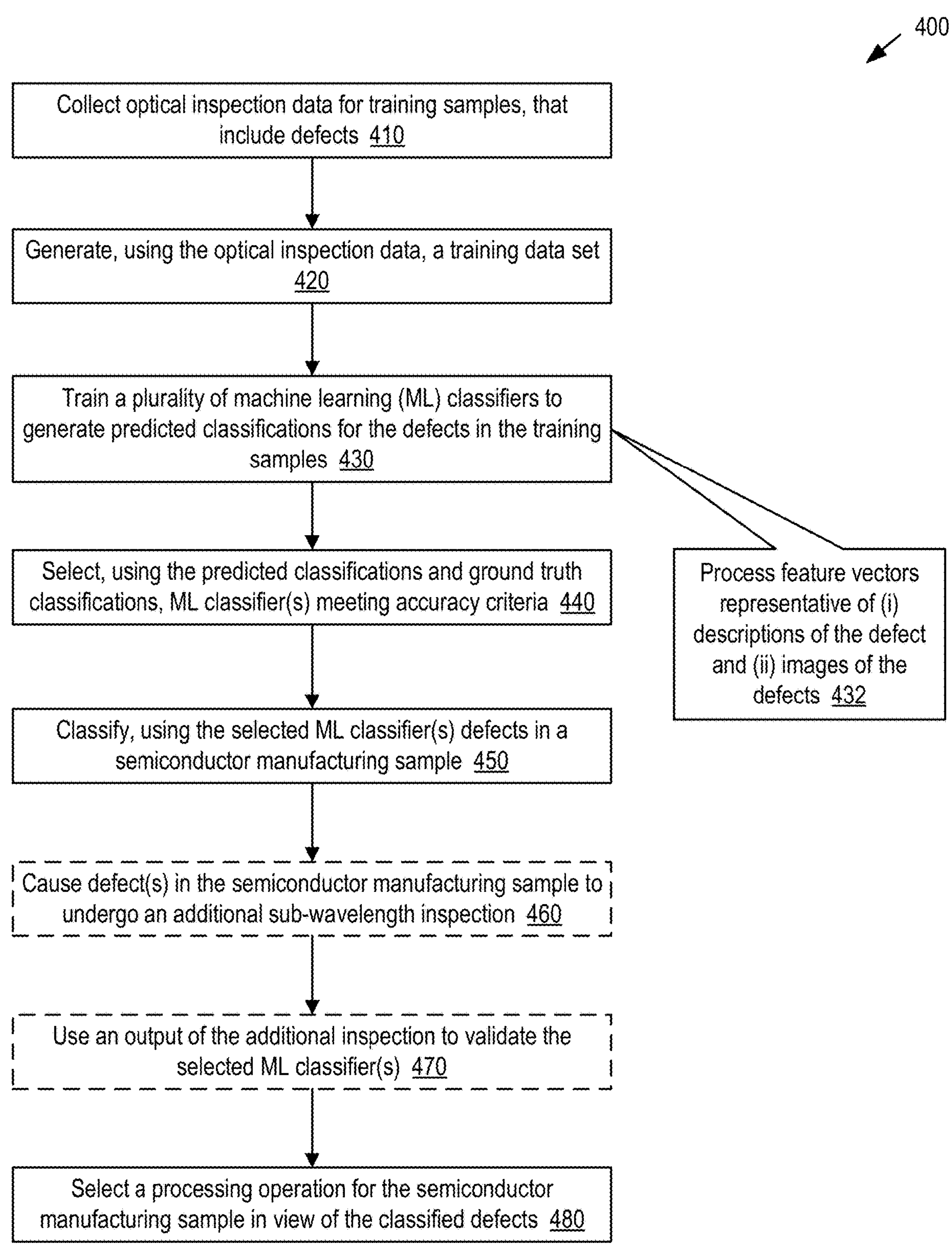
FIG. 4 is a flow diagram of an example method of training and deployment of optical inspection-based defect classification in wafer manufacturing using multiple machine learning models, in accordance with at least one embodiment.

FIG. 4 is a flow diagram of an example method 400 of training and deployment of optical inspection-based defect classification in wafer manufacturing using multiple machine learning models, in accordance with at least one embodiment. Method 400 can be performed using systems and components illustrated in FIG. 1 or similar systems and components. Some or all blocks of method 400 can be performed responsive to instructions from computing device 118 (e.g., optical inspection control module 120) and/or electronics module 130. Computing device 118 and/or electronics module 130 can include one or more processing devices, such as central processing units (CPUs), graphics processing units (GPUs) application-specific integrated circuits (ASICs), field programmable gate arrays (FPGAs), digital signal processors (DSPs), network processors, or the like. The processing device(s) can be communicatively coupled to one or more memory devices, such as read-only memory (ROM), flash memory, static memory, dynamic random access memory (DRAM), and the like. In some embodiments, computing device 118 and/or electronics module 130 can be connected to a larger network of computing devices.

Method 400 can be used to perform a quality inspection of a semiconductor manufacturing sample. In some embodiments, the semiconductor manufacturing sample is still positioned inside a processing chamber. In some embodiments, method 400 can be implemented once the sample has been removed from the processing chamber. The inspection process can occur at low temperatures, or at temperatures that are less or significantly less than the room temperature. Alternatively, the inspection process can occur at room temperature, above room temperature, or significantly above room temperature. In some embodiments, during the inspection process, the sample can experience pressure that is less than the atmospheric pressure, including low vacuum or high vacuum conditions.

At block 410, method 400 can include collecting optical inspection data for one or more training samples (e.g., samples 202, as illustrated in FIG. 2). The one or more training samples can include a plurality of defects. The optical inspection data can include light scattering data associated with light reflected or scattered from the one or more training samples. The light scattering data can be collected for a plurality of scattering angles, a plurality of scattered polarizations, a plurality of wavelengths, and/or the like.

At block 420, method 400 can include generating, using the optical inspection data, a training data set. The training data set can include descriptions of the plurality of defects (e.g., defect description 212), images of the plurality of defects (e.g., defect images 214). The training data set can include ground truth classifications for the plurality of defects. For example, the ground truth classifications can be obtained using a sub-wavelength resolution inspection system that includes a scanning electron microscopy system, an X-ray spectroscopy system, a tunneling electron microscopy system, an atomic force microscopy system, and/or or a neutron scattering system. The descriptions of the plurality of defects can include, for an individual defect, an SNR associated with the defect, one or more dimensions associated with the defect, a location of the defect, a total light intensity associated with the defect, an angular distribution of light intensity associated with the defect, a polarization data associated with the defect (e.g., an amount of s- and p-polarizations of the light associated with the defect), and/or the like. In some embodiments, the one or more dimensions associated with the defect can include a diameter of the defect, X- and/or Y-dimensions of the defect, an area of the defect, which can include a number of pixels of one or more detectors covered by (receiving scattered light from) the defect, and/or the like. In some embodiments, the descriptions of the plurality of defects can include one or more cross-channel ratios for the individual defect. A cross-channel ratio refers to a ratio of dimensions (e.g., diameters, sizes of defects along one or more dimensions) of defects detected using different detectors, e.g., a ratio of a defect size detected by a narrow-angle detector to a defect size detected using a wide-angle detector, and/or the like).

At block 430, method 400 can include using the training data set to train a plurality of ML classifiers to generate predicted classifications for the plurality of defects in the one or more training samples. In some embodiments, the plurality of ML classifiers includes two or more of: a decision tree ML classifier, an adaptive boosting ML classifier, a gradient boosting ML classifier, a K-nearest neighbor ML classifier, a logistic regression ML classifier, a support vector machine ML classifier, a deep neural network ML classifier, and/or other ML classifiers. The predicted classifications can include, for an individual defect of the plurality of defects, a type of the individual defect and/or one or more dimensions of the individual defect.

In some embodiments, as illustrated by the callout block 432, using the training data set to train the plurality of ML classifiers can include processing, using the plurality of ML classifiers, (i) a first set of feature vectors representative of the descriptions of the plurality of defects, and (ii) a second set of feature vectors representative of the images of the plurality of defects. The second set of feature vectors can be generated using a convolutional neural network (e.g., CNN 216).

At block 440, method 400 can include selecting, using the predicted classifications and the ground truth classifications, one or more ML classifiers from the plurality of ML classifiers. The one or more selected ML classifiers can meet one or more accuracy criteria. For example, to be selected, a first ML classifier of the plurality of ML classifiers can have a first evaluation metric (e.g., F1 score) that exceeds a threshold metric (e.g., a threshold F1 score) or exceeds a second evaluation metrics of a second ML classifier of the plurality of ML classifiers. In some embodiments, selection of the one or more ML classifiers can be performed by a processing device responsive to instructions from a user/developer of the optical image-based defect classification system, e.g., upon reviewing with various evaluation metrics (e.g., evaluation metrics 250 in FIG. 2) presented on the user's graphical user interface (e.g., computer screen) for selection. In some embodiments, similar categories of evaluation metrics (e.g., precision, recall, F1 score, etc.) can be presented together (e.g., concurrently) to facilitate selection of ML classifiers. In some embodiments, selection of the one or more ML classifiers can be performed without human input.

At block 450, method 400 can continue with using the one or more selected ML classifiers to classify one or more defects in the semiconductor manufacturing sample (e.g., sample 302 in FIG. 3). In some embodiments, at block 460, method 400 can include causing an individual defect of the one or more defects in the semiconductor manufacturing sample to undergo an additional inspection using a sub-wavelength resolution inspection system (e.g., high-resolution inspection 320 in FIG. 3). In some embodiments, the individual defect can be selected from the one or more defects in the semiconductor manufacturing sample based on a random selection. In some embodiments, the individual defect can be selected based on the individual defect being classified as a target-class defect, e.g., a defect whose classification has been determined by the ML classifiers with a confidence that is below a target confidence. At block 470, method 400 can include using an output of the additional inspection to validate the one or more selected ML classifiers (e.g., perform validation 330 in FIG. 3).

At block 480, method 400 can include selecting a processing operation for the semiconductor manufacturing sample in view of the classified one or more defects in the semiconductor manufacturing sample. The processing operation can include deposition (e.g., PVD and/or CVD), etching, patterning, polishing, removing one or more films deposited on the sample (and/or depositing one or more new films), discarding the sample, and/or performing any other processing operation.

Figure 5:
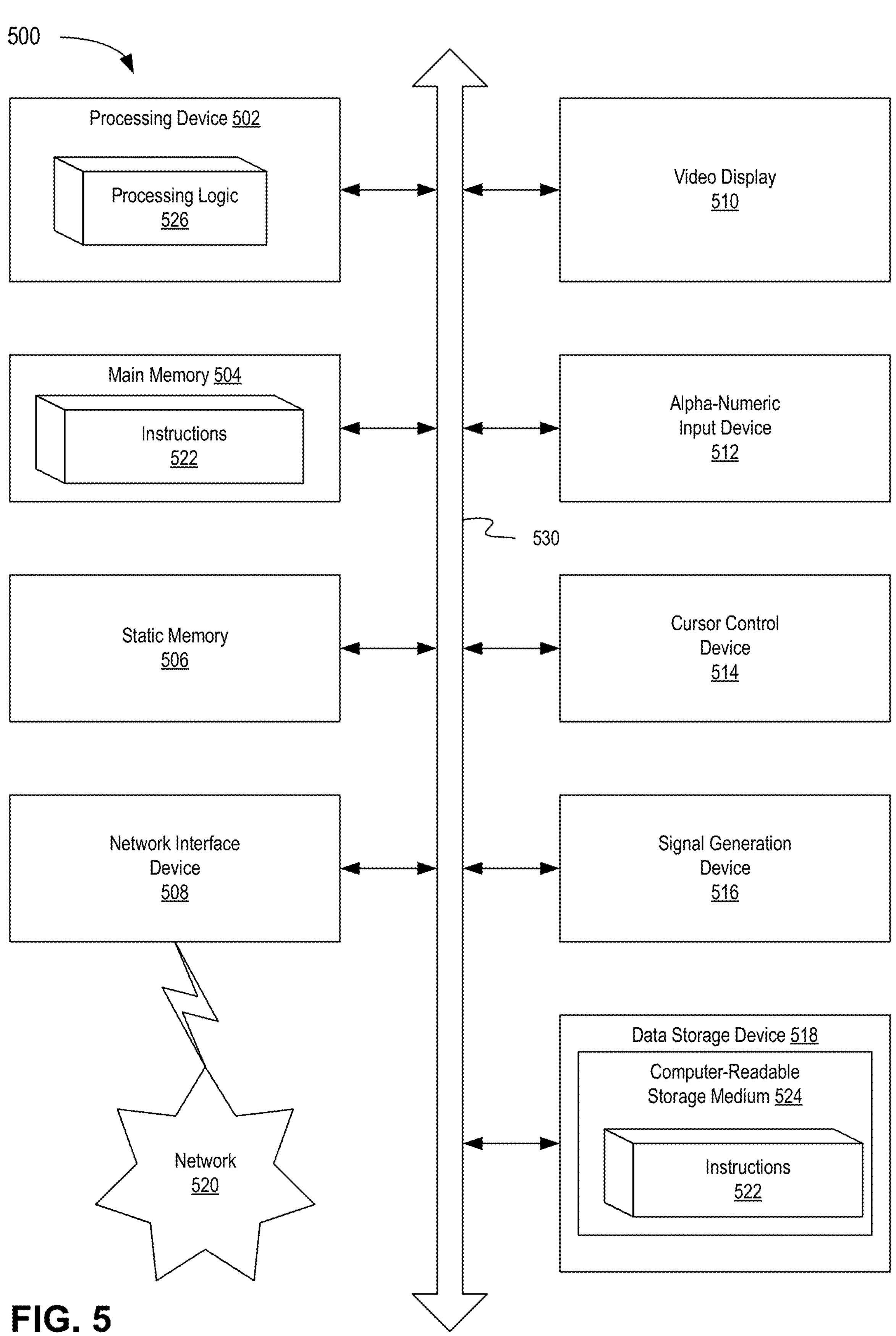
FIG. 5 depicts a block diagram of an example computer system capable of supporting operations of the present disclosure, according to at least one embodiment.

FIG. 5 depicts a block diagram of an example computer system 500 capable of supporting operations of the present disclosure, according to at least one embodiment. In various illustrative examples, example computer system 500 can be or include computing device 118 of FIG. 1. Example computer system 500 may be connected to other computer systems in a LAN, an intranet, an extranet, and/or the Internet. Computer system 500 may operate in the capacity of a server in a client-server network environment. Computer system 500 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 500 may include a processing device 502 (also referred to as a processor or CPU), which may include any suitable processing logic 526. Example computer system 500 may further include a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which may communicate with each other via a bus 530.

Processing device 502 represents one or more general-purpose processing devices such as a microprocessor, central processing unit, or the like. More particularly, processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 502 may be configured to execute instructions implementing example method 400 of training and deployment of optical inspection-based defect classification in wafer manufacturing using multiple machine learning models.

Example computer system 500 may further comprise a network interface device 508, which may be communicatively coupled to a network 520. Example computer system 500 may further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 516 (e.g., a speaker).

Data storage device 518 may include a computer-readable storage medium (or, more specifically, a non-transitory computer-readable storage medium) 524 on which is stored one or more sets of executable instructions 522. In accordance with one or more aspects of the present disclosure, executable instructions 522 may comprise executable instructions implementing example method 400 of training and deployment of optical inspection-based defect classification in wafer manufacturing using multiple machine learning models.

Executable instructions 522 may also reside, completely or at least partially, within main memory 504 and/or within processing device 502 during execution thereof by example computer system 500, main memory 504 and processing device 502 also constituting computer-readable storage media. Executable instructions 522 may further be transmitted or received over a network via network interface device 508.

While the computer-readable storage medium 524 is shown in FIG. 5 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

It should be understood that the above description is intended to be illustrative, and not restrictive. Many other implementation examples will be apparent to those of skill in the art upon reading and understanding the above description. Although the present disclosure describes specific examples, the systems and methods of the present disclosure are not limited to the examples described herein and may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The embodiments of methods, hardware, software, firmware or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment, embodiment, and/or other exemplarily language does not necessarily refer to the same embodiment or the same example, but may refer to different and distinct embodiments, as well as potentially the same embodiment.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method comprising:

generating a training data set comprising:

optical inspection training data collected for one or more training samples, each training sample having one or more known defects, and one or more high-resolution target outputs, each target output comprising a ground truth defect classification, generated using sub-wavelength imaging of a respective sample of the one or more training samples;

training, using the training data set, a plurality of machine learning (ML) classifiers to predict, based on correlation of the optical inspection training data with corresponding high-resolution target outputs, defect classifications for the one or more training samples;

computing one or more evaluation metrics representative of learned ability of the trained plurality of ML classifiers to predict defect classifications;

selecting, based on the one or more evaluation metrics, an ensemble of ML classifiers from the plurality of ML classifiers; and causing the ensemble of ML classifiers to be deployed to classify one or more defects in a semiconductor manufacturing sample.

2. The method of claim 1, wherein training an individual ML classifier of the ML classifiers comprises processing, using the individual ML classifier, a training input comprising:

optical inspection training data for a training sample, and a data structure comprising a description of one or more known defects in the training sample, the description of the one or more known defects indexed by coordinates of the one or more known defects.

3. The method of claim 1, wherein the sub-wavelength imaging is performed using one or more of:

a scanning electron microscopy system, an X-ray spectroscopy system, a tunneling electron microscopy system, an atomic force microscopy system, or a neutron scattering system.

4. The method of claim 2, wherein the description of an individual known defect in the data structure comprises one or more of:

a signal-to-noise ratio (SNR) associated with the individual known defect, one or more dimensions of the individual known defect, a location of the individual known defect, one or more cross-channel ratios for the individual known defect, a total light intensity associated with the individual known defect, an angular distribution of light intensity associated with the individual known defect, or polarization data associated with the individual known defect.

5. The method of claim 1, wherein the optical inspection training data comprises light scattering data associated with light reflected or scattered from the one or more training samples.

6. The method of claim 5, wherein the light scattering data is collected for one or more of:

a plurality of scattering angles, a plurality of scattered polarizations, or a plurality of wavelengths.

7. The method of claim 1, wherein the predicted known classifications comprise one or more of:

a type of an individual defect, or one or more dimensions of the individual defect.

8. The method of claim 1, wherein training the plurality of ML classifiers comprises:

processing, using the plurality of ML classifiers, (i) a first set of feature vectors representative of descriptions of the one or more known defects, and (ii) a second set of feature vectors representative of images of the one or more known defects, wherein the second set of feature vectors is generated using a convolutional neural network.

9. The method of claim 1, wherein the ensemble of ML classifiers comprises two or more of:

a decision tree ML classifier, an adaptive boosting ML classifier, a boosting ML classifier, a K-nearest neighbor ML classifier, a logistic regression ML classifier, a support vector machine ML classifier, a linear discriminant analysis classifier, or a deep neural network ML classifier.

10. The method of claim 1, wherein selecting a first ML classifier of the plurality of ML classifiers is responsive to the first ML classifier having at least one evaluation metric of the one or more evaluation metrics that exceeds at least one of (i) a threshold metric, or (ii) a corresponding evaluation metric of a second ML classifier of the plurality of ML classifiers.

11. The method of claim 1, further comprising:

causing an individual defect of the one or more defects in the semiconductor manufacturing sample to undergo an additional inspection using a sub-wavelength resolution inspection system.

12. The method of claim 11, wherein the individual defect is selected for the additional inspection based on one or more of:

a random selection, or the individual defect being classified as a target-class defect by at least one ML classifier of the ensemble of ML classifiers.

13. The method of claim 11, further comprising:

using an output of the additional inspection to validate the ensemble of ML classifiers.

14. The method of claim 1, further comprising:

selecting a processing operation for the semiconductor manufacturing sample in view of the one or more defects in the semiconductor manufacturing sample.

15. A system comprising:

a memory device; and a processing device communicatively coupled to the memory device, to:

generate a training data set comprising (i) optical inspection training data collected for one or more training samples, each training sample having one or more known defects, and (ii) one or more high-resolution target outputs, each target output comprising a ground truth defect classification, generated using sub-wavelength imaging of a respective sample of the one or more training samples;

train, using the training data set, a plurality of machine learning (ML) classifiers to predict, based on correlation of the optical inspection training data with corresponding high-resolution target outputs, defect classifications for the one or more training samples;

compute one or more evaluation metrics representative of learned ability of the trained plurality of ML classifiers to predict defect classifications;

select, based on the one or more evaluation metrics, an ensemble of ML classifiers from the plurality of ML classifiers; and cause the ensemble of ML classifiers to be deployed to classify one or more defects in a semiconductor manufacturing sample.

16. The system of claim 15, wherein the optical inspection training data comprises light scattering data associated with light reflected or scattered from the one or more training samples, and wherein the light scattering data is collected for one or more of: a plurality of scattering angles, a plurality of scattered polarizations, or a plurality of wavelengths.

17. The system of claim 15, wherein the training data set generated by the system includes a data structure comprising a description of one or more defects, and wherein the description of an individual known defect in the data structure comprises one or more of:

a signal-to-noise ratio (SNR) associated with the individual known defect, one or more dimensions of the individual known defect, a location of the individual known defect, one or more cross-channel ratios for the individual known defect, a total light intensity associated with the individual known defect, an angular distribution of light intensity associated with the individual known defect, or polarization data associated with the individual known defect.

18. The system of claim 15, wherein to train the plurality of ML classifiers, the processing device is to:

process, using the plurality of ML classifiers, (i) a first set of feature vectors representative of descriptions of the one or more known defects, and (ii) a second set of feature vectors representative of images of the one or more known defects, wherein the second set of feature vectors is generated using a convolutional neural network.

19. The system of claim 15, wherein the ensemble of ML classifiers comprises two or more of: a decision tree ML classifier, an adaptive boosting ML classifier, a boosting ML classifier, a K-nearest neighbor ML classifier, a logistic regression ML classifier, a support vector machine ML classifier, a linear discriminant analysis classifier, or a deep neural network ML classifier.

20. The system of claim 15, wherein selecting a first ML classifier of the plurality of ML classifiers is responsive to the first ML classifier having at least one evaluation metric of the one or more evaluation metrics that exceeds at least one of (i) a threshold metric, or (ii) a second corresponding evaluation metric of a second ML classifier of the plurality of ML classifiers.

21. A non-transitory computer-readable storage medium storing instructions thereon that, when executed by a processing device, cause the processing device to perform operations comprising:

generating a training data set comprising (i) optical inspection training data collected for one or more training samples, each training sample having one or more known defects, and (ii) one or more high-resolution target outputs, each target output comprising a ground truth defect classification, generated using sub-wavelength imaging of a respective sample of the one or more training samples;

training, using the training data set, a plurality of machine learning (ML) classifiers to predict, based on correlation of the optical inspection training data with corresponding high-resolution target outputs, defect classifications for the one or more training samples;

computing one or more evaluation metrics representative of learned ability of the trained plurality of ML classifiers to predict defect classifications;

selecting, based on the one or more evaluation metric an ensemble of ML classifiers from the plurality of ML classifiers; and causing the ensemble of ML classifiers to be deployed to classify one or more defects in a semiconductor manufacturing sample.

* * * * *